United States Patent [19]

Woolley

[11] Patent Number: 5,051,752
[45] Date of Patent: Sep. 24, 1991

[54] ANGLE MEASUREMENT COMPENSATION TECHNIQUE FOR AMPLITUDE COMPARISON MONOPULSE RECEIVER

[75] Inventor: Richard L. Woolley, Canoga Park, Calif.

[73] Assignee: Hughes Aircraft Company, Los Angeles, Calif.

[21] Appl. No.: 609,334

[22] Filed: Nov. 5, 1990

[51] Int. Cl.$^5$ .................... G01S 7/40; G01S 13/44
[52] U.S. Cl. ............................... 342/151; 342/174
[58] Field of Search .................. 342/151, 174, 149

[56] References Cited

U.S. PATENT DOCUMENTS

| | | | |
|---|---|---|---|
| 3,810,177 | 5/1974 | Tabourier | 342/151 |
| 4,642,642 | 2/1987 | Uurtamo | 342/151 |
| 4,994,810 | 2/1991 | Sinsky | 342/151 |

Primary Examiner—Gilberto Barrón, Jr.
Attorney, Agent, or Firm—C. D. Brown; R. M. Heald; W. K. Denson-Low

[57] ABSTRACT

A compensated amplitude comparison monopulse receiver (10) having an angular measurement capability substantially unaffected by mismatches in channel transient response and target range tracking inaccuracy is disclosed herein. The inventive monopulse receiver (10) includes a first receiver channel (24) for impressing a first output voltage S1 on a first output port (28) thereof in response to excitation by a sum signal. A second receiver channel (26) impresses a second output voltage S2 on a second output port (30) thereof in response to excitation by the sum and a difference signal. In a calibration mode, a calibration source (22) provides a series of calibration pulses to the first and second channels (24, 26) which induces first and second calibration voltages to appear on the first and second output ports (28, 30) thereof. Sampling gates (32, 34) sample the first and second calibration voltages subsequent to application of each calibration pulse to the first and second receiver channels (24, 26). In a tracking mode the sample gates (32, 34) are operative to sample the first and second output voltages present on the first and second output ports (28, 30). The inventive receiver 10 further includes circuitry (48, 50) for calculating the angular location of the first object from the sampled first and second output voltages. A compensation network (36) then adjusts the calculated angular location on the basis of the sampled calibration voltages.

9 Claims, 2 Drawing Sheets

ANGLE MEASUREMENT COMPENSATION TECHNIQUE FOR AMPLITUDE COMPARISON MONOPULSE RECEIVER

BACKGROUND OF THE INVENTION

1. Field of the Invention

This invention relates to radar signal processing techniques. In particular, the present invention relates to techniques for correcting measurement errors associated with radar returns from extended targets.

While the present invention is described herein with reference to a particular embodiment, it is understood that the invention is not limited thereto. Those having ordinary skill in the art and access to the teachings provided herein will recognize additional embodiments within the scope thereof.

2. Description of the Related Art

In conventional monopulse radar systems, the angular location of a target is measured by comparing the responses of a pair of ostensibly substantially identical receiver channels to radar returns from the target. However, differences in gain and bandwidth arise between receiver channels as a result of variations in parameters of the physical components actually utilized in each channel. These component variations may induce disparities in the transient responses of the receiver channels, thereby leading to errors in measurement of angular location. These errors are compounded a the size of the range gate (region of space under surveillance) approaches the size of the target. Such targets may be said to "extend" throughout the range gate.

Errors in measurement of angular location are also dependent on the accuracy of the monopulse receiver system's range-tracking capability. In particular, the output of the monopulse receiver channel pair is contemporaneously sampled when returns from a predetermined position within the range gate are expected to arrive at the receiver. To the extent that imperfect range tracking results in the target occupying a location in the range gate other than this predetermined position, the returns therefrom will arrive at the receiver (arrival time) at a time other than that expected. It follows that the time the outputs of the receiver channel pair are sampled (sampling time) relative to arrival time will not be constant if inaccuracies in range-tracking are present. Moreover, the differential transient responses of the receiver channels will cause the difference in magnitude between the respective outputs thereof to vary as sampling time varies relative to arrival time. Since target angular location is determined by utilizing the relative magnitudes of the channel outputs, the apparent angular position of the target will change in response to deviations in the time interval between sample time and arrival time. Thus, imperfections in the accuracy of range tracking in conventional monopulse receiver systems exacerbate errors in measurement of angular location.

It is noted that range track errors, and therefore angular measurement errors, may become particularly acute when multiple frequencies are used in radar surveillance of a complex target. Specifically, complex targets include a number of surfaces from which radar pulses are scattered. When radiation of multiple frequencies is used to illuminate such a target the reflections therefrom can combine in a manner such that the range centroid of the target appears to vary over the physical extent thereof. Consequently, further range track error may be introduced.

Hence, a need in the art exists for a monopulse receiver having an angular measurement capability substantially unaffected by mismatches in channel transient response or target range tracking inaccuracy.

SUMMARY OF THE INVENTION

The aforementioned need in the art is addressed by the compensated amplitude comparison monopulse receiver of the present invention. The receiver of the present invention is disposed to determine the angular location of a first object under surveillance by processing a sum and difference signal received therefrom. The inventive monopulse receiver includes a first receiver channel for impressing a first output voltage on a first output port thereof in response to excitation by the sum signal. A second receiver channel impresses a second output voltage on a second output port thereof in response to excitation by the sum and difference signals.

In a calibration mode, a calibration source provides a series of calibration pulses to the first and second channels. The series of calibration pulses are substantially similar to the sum signal which would be received from a second object under surveillance located a known range from the receiver. The series of calibration pulses is then applied to the first and second receiver channels, and this induces first and second calibration voltages to appear on the first and second output ports thereof. A sample gate samples the first and second calibration voltages subsequent to application of each calibration pulse to the first and second receiver channels.

In a tracking mode the sample gate is operative to sample the first and second output voltages present on the first and second output ports. The inventive receiver further includes circuitry for calculating the angular location of the first object from the sampled first and second output voltages. A compensation network then adjusts this calculated angular location on the basis of the sampled calibration voltages.

DETAILED DESCRIPTION OF THE INVENTION

Figure 1:
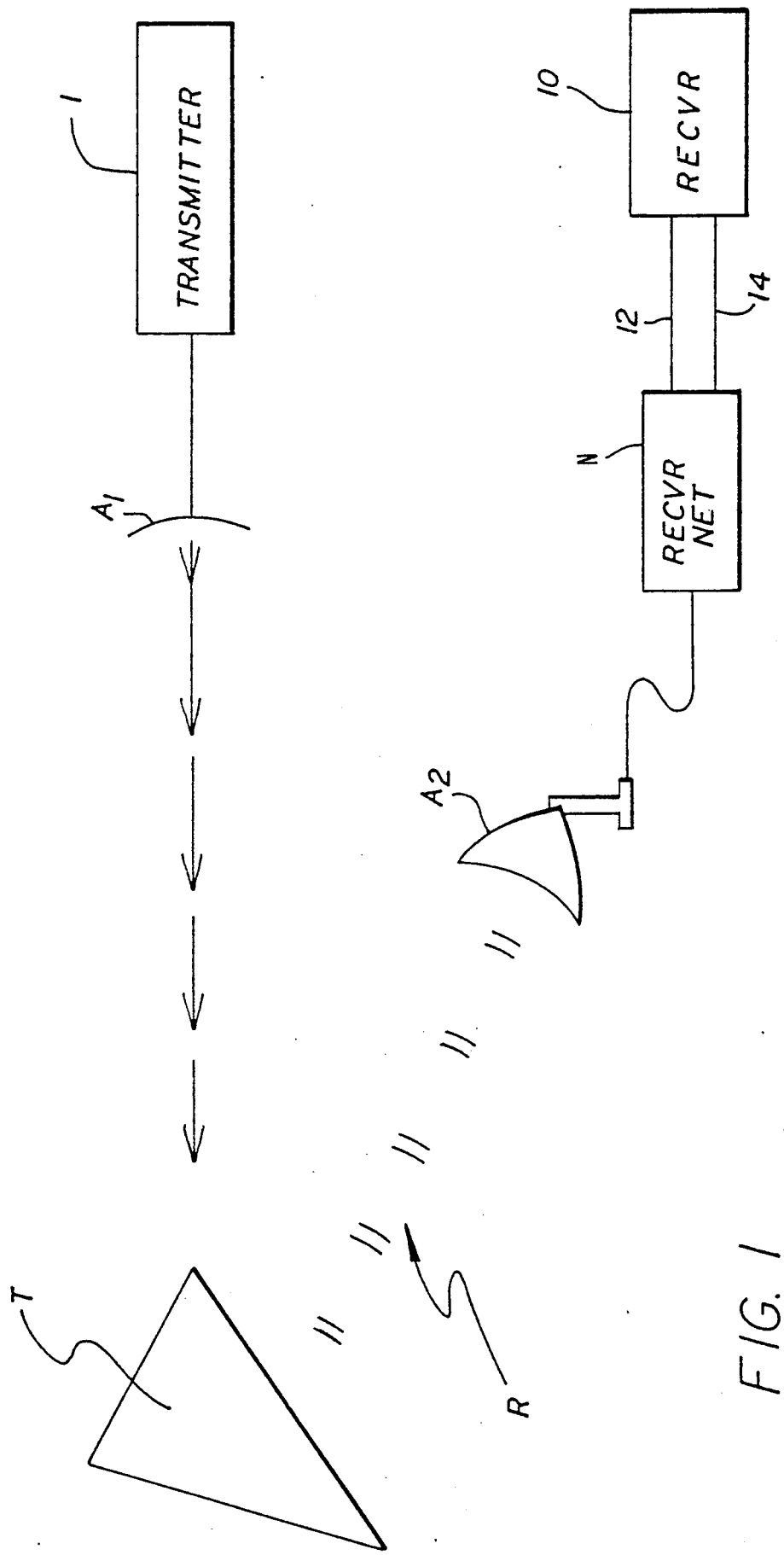
FIG. 1 shows a target illuminated by pulsed radiation from a transmitter.

FIG. 1 shows a target T illuminated by pulsed radiation from a transmitter 1 having an antenna $A_1$. The transmitter 1 and associated antenna $A_1$ may be located on the ground or on an aircraft as is common in the art. The target may be a missile by way of example. In synchrony with transmission of the pulsed radiation the transmitter impresses an electrical timing pulse upon a signal line coupled thereto. Radar reflections R from the illuminated target T are detected by a second antenna $A_2$ which generates a detection signal. The receive antenna $A_2$ is electrically coupled to a receive network N for converting the detected reflections into electrical sum (S) and difference (D) signals. The sum and difference signals are utilized by the compensated amplitude comparison monopulse receiver 10 of the present invention to determine the angular position of the target T. The receiver 10 accepts the sum and difference signals from the network N on first and second input lines 12 and 14.

Figure 2:
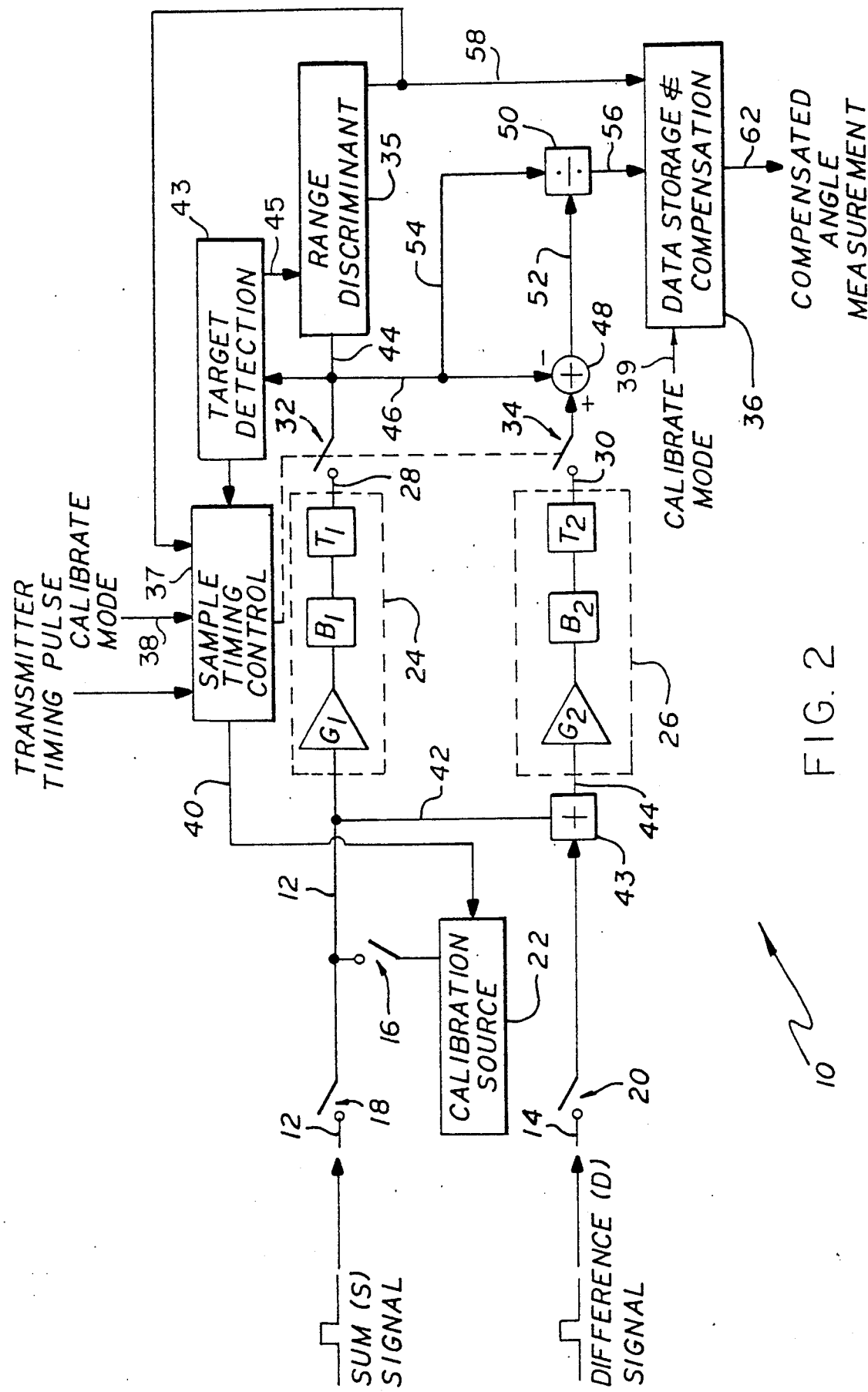
FIG. 2 is a block diagrammatic representation of the compensated amplitude comparison monopulse receiver of the present invention.

FIG. 2 shows a block diagrammatic representation of the compensated receiver 10 of the present invention. The receiver 10 is operative in both a calibration mode and a tracking mode, and a brief summary of each is initially set forth with reference to FIG. 2.

In the calibration mode a first switch 16 is closed while second and third switches 18 and 20 are opened. This precludes signals from the antenna from being processed by the receiver 10 and places a calibration source 22 in electrical communication therewith. The calibration source 22 generates a series of calibration pulses substantially similar to the sum signal which would be produced by the antenna in response to detection of reflections from a target a known range therefrom. Each calibration pulse is utilized to contemporaneously drive first and second receiver channels 24 and 26 having respective transient responses g1(t) and g2(t). The first and second channels 24 and 26 impress first and second calibration voltages C1 and C2 on first and second channel output ports 28 and 30 upon processing the series of calibration pulses.

The first and second calibration voltages C1 and C2 are sampled at a calibration sampling time by closing first and second sample gates 32 and 34. The first and second gates 32 and 34 are controlled by a sample timing control circuit 37, which is switched into calibration mode operation in response to a calibration mode signal impressed on a first mode selection line 38. In addition, a calibration mode range discriminant signal $E_{Rcal}$ proportional to the time interval between the sampling time and the time at which the calibration pulse giving rise to the sampled calibration voltage was applied to the channels 24 and 26 is generated by a range discriminant circuit 35. Both the range discriminant signal $E_{Rcal}$ and an angle error correction voltage derived from the first and second sampled calibration voltages C1' and C2' are stored in a data storage and compensation network 36. The network 36 is also switched into the calibration mode by a calibration mode signal transmitted by a second mode selection line 39.

In the tracking mode, the second and third switches 18 and 20 are closed and the first switch 16 is opened. This isolates the calibration source 22 from the first and second channels 24 and 26. Conversely, in the tracking mode the sum signal (S) drives both channels 24 and 26 while the difference signal (D) drives the second channel 26. As a consequence, first and second output voltages S1 and S2 appear on the first and second output ports 28 and 30. The first and second output voltages S1 and S2 are sampled by contemporaneously closing the first and second sample gates 32 and 34 at a tracking sampling time. A determination of the apparent angular location of the target is then made on the basis of the sampled first and second output voltages S1' and S2'. A tracking mode range discriminant signal $E_{Rtrack}$ proportional to the time interval between reception of the target reflection and the sampling time is then generated by the range discriminant 35. The apparent angular target location is then adjusted by reference to the particular angle error correction voltage generated under the condition of $E_{Rcal}$ being substantially equivalent to $E_{Rtrack}$. In this manner the receiver 10 compensates for the differing transient responses of the first and second channels 24 and 26, thereby enhancing the accuracy with which target angular location is measured by the receiver 10.

As mentioned above, the calibration source 22 provides a series of calibration pulses mimicking the sum signal which would be generated in response to radar pulse reflections detected by the antenna coupled to the receiver 10. Accordingly, the calibration source 22 includes circuitry suitable for synthesizing relatively low-voltage pulse waveforms. The calibration source 22 launches a calibration pulse onto the input line 12 via the closed switch 16 in response to a triggering pulse present on a signal line 40. The line 40 is triggered by the sample timing control circuit 37, which is electrically connected to the line 40. The circuit 37 triggers the line 40 after a predetermined time delay subsequent to reception of the transmitter timing pulse from the transmitter (not shown).

In both the tracking and calibration modes, the range discriminant 35 is operatively enabled by a target detection network 43. The detection network 43 signals the discriminant 35 upon detection of either target or detection pulses on the line 45. The network 43 also closes a tracking loop which includes the channel 24 and the sample timing control circuit 37.

Subsequent to being launched by the source 22, the calibration pulses impinge on the first channel 24 by traversing the signal line 12. Similarly, the calibration pulses are routed to the second channel 26 via the signal line 12, a signal line 42 coupled thereto, a first summation network 43, and a signal line 44 linking the summation network with the channel 26. The first channel 24 has a first bandwidth B1, a first transient response time constant T1, and a first adjustable steady-state gain G1. The second channel 26 has a second bandwidth B2, a second transient response time constant T2, and a second adjustable steady-state gain G2. In the embodiment of FIG. 2, the differences in bandwidth and transient time constant between the first and second channels 24 and 26 result from generally unavoidable variation in the parameters of the components located therein. The gains G1 and G2 may be controlled by, for example, externally adjusting the bias supply of amplification circuitry within the first and second channels 24 and 26. Again, when driven by calibration pulses the channels 24 and 26 impress the first and second calibration voltages upon the first and second output ports 28 and 30.

The transient gain of the first channel 24 as a function of B1 and T1 at a time (t) is denoted as g1(B1,T1,t). Similarly, the transient gain of the second channel 26 is represented as g2(B2,T2,t). As a result of the gates 32 and 34 being closed to sample the first and second calibration voltages present on the output ports 28 and 30, the magnitude of the sampled first calibration voltage $|C1'|$ is impressed on signal lines 45 and 46. The voltage $|C1'|$ may be expressed in terms of the magnitude of the calibration pulse $|Cp|$ giving rise thereto as:

$$|C1'| = |Cp|*G1*g1(B1, T1, t_s) \qquad [1]$$

where * denotes multiplication and $t_s$ is the time at which the first and second calibration voltages are sampled. The sampled second calibration voltage C2' is combined with $|C1|'$ by a second summation network 48 to produce a sampled calibration difference voltage Dc' which may be expressed as:

$$Dc' = G2*g2(B2,T2,T_s)*|Cp| - |C1'| \qquad [2]$$

Next, the summation network 48 transmits the voltage Dc' to a divider circuit 50 via a signal line 52. The voltage |C1'| is also sent to the divider circuit 50 by way of a signal line 54 coupled to the signal line 46. The divider circuit 50 impresses an angle error correction voltage proportional to the ratio Dc'/|C1'| on signal line 56. Both the correction voltage Dc'/|C1'| and its associated calibration discriminant $E_{Rcal}$ generated when the gate 32 was closed to create |C1'| are then stored in the data storage network 36. $E_{Rcal}$ may be generated through a number of schemes familiar to those skilled in the art. In a particular method $E_{Rcal}$ is generated by comparison of the magnitudes of sum signals adjacent to a maximal sum signal. The maximal sum signal may be designated by a detection function, which compares the sum signals received over specified time intervals.

In the calibration mode the time of sampling the calibration voltages present at the output ports 28 and 30 is varied relative to the time at which calibration pulses are launched on the line 12 by the calibration source 22. In this way a compensation table of angle correction voltages Dc'/|C1'| with associated calibration discriminants $E_{Rcal}$ is stored in the data storage network. The first step in the calibration mode is to adjust the time at which the calibration voltages are sampled relative to the time at which the calibration pulses are launched such that $E_{Rcal}$ is driven to zero. This first calibration step is performed by the sample timing control circuit 37, and is facilitated by feeding back $E_{Rcal}$ thereto via a feedback line 41. The first and second channel gains G1 and G2 are then adjusted under this condition of $E_{Rcal}=0$ such that the angle correction voltage Dc'/|C1'| is also driven to zero. The channel gains then remain fixed at these adjusted levels for the duration of the calibration. Further, this gain adjustment results in the operating condition of:

$$G2 * g2(B2, T2, t_{so}) = G1 * g1(B1, T1, t_{so}) \quad [3]$$

where $t_{so}$ is the sampling time corresponding to $E_{Rcal}=0$.

The sample timing control circuit 37 next induces sampling of the calibration voltages earlier and later relative to the time of calibration pulse launching than was done under the condition $E_{Rcal}=0$, and the angle correction voltages are stored as a function of $E_{Rcal}$ to construct the compensation table. The angle correction voltages for any sampling time ts which correspond to a particular value of $E_{Rcal}$ are given by:

$$Dc'/|C1'| = \frac{g1(B1, T1, t_{so})}{g2(B2, T2, t_{so})} * \frac{g2(B2, T2, t_s)}{g1(B1, T1, t_s)} - 1 \quad [4]$$

The time interval over which the sampling time varies relative to the pulse launching time will generally correspond to the time taken by a target reflection to traverse the range gate occupied by the target. By varying sampling time relative to pulse launching time, the calibration mode simulates the variation in tracking mode sampling time relative to the receipt of target sum and difference signals. As mentioned in the Background of the Invention, this variation in the relative tracking mode sampling time arises because of movement of the target within the range gate (imperfect range tracking).

As was discussed briefly above, in the tracking mode the second and third switches 18 and 20 are closed and the first switch 16 is opened. This allows the sum (S) and difference (D) signals from the antenna to traverse the input lines 12 and 14, and isolates the calibration source 22. The sum signal addresses the first receiver channel 24 via the input line 12, and is relayed to the summation network 43 by the signal line 42. The difference signal propagates along the input line 14 to the summation network 43 and is combined with the sum signal therein. The network 43 then impresses the result of this combination on the signal line 44, which is coupled to the second receiver channel 26. In response to the sum signal the first channel 24 induces the first output voltage at the first output port 28. Similarly, in response to the voltage impressed on the line 44 the second receiver channel 26 generates the second output voltage at the second output port 30.

As a result of the gates 32 and 34 being closed in the tracking mode to sample the first and second output voltages S1 and S2 present on the output ports 28 and 30, the magnitude of the sampled first output voltage |S1'| is impressed on the signal lines 45 and 46. The voltage |S1'| may be expressed in terms of the magnitude of the sum signal |S| giving rise thereto as:

$$|S1'| = |S| * G1 * g1(B1, T1, t_s) \quad [5]$$

where * denotes multiplication. The sampled second output voltage S2' is combined with |S1'| by the summation network 48 to produce a sampled tracking difference voltage Dt' which may be expressed as:

$$Dt' = G2 * g2(B2, T2, t_s) * |S| * |1+q| - |S1'| \quad [6]$$

where $q = D*S/|S|^2$. Next, the summation network 48 transmits the voltage Dt' to the divider circuit 50 via the signal line 52. The voltage |S1'| is also sent to the divider circuit 50 by way of the signal line 54 coupled to the signal line 46. The divider circuit 50 impresses a preliminary measurement of the angular location of the target being tracked proportional to the voltage ratio Dt'/|S1'| on signal line 56. Both the preliminary angular measurement voltage Dt'/|S1'| and its associated tracking discriminant $E_{Rtrack}$ generated when the gate 32 was closed to create |S1'| are then transferred to the data storage network 36.

In the tracking mode the discriminant 35 generates the tracking discriminant on the signal line 58. The tracking discriminant $E_{Rtrack}$ represents the fractional range gate error in the current sampling time upon detection of the target. $E_{Rtrack}$ is driven to zero by modifying the sampling time relative to the transmitter timing pulse. A number of conventional feedback control techniques may be used to control the sample timing such the average value of $E_{Rtrack}$ is approximately zero.

Since the transient responses of the first and second channels 24 and 26 differ, the relative magnitude difference between the first and second output voltages S1 and S2 will vary depending on the interval between sampling time and the actual time of arrival of target reflections at the receiver 10. Hence, the relative magnitude of the first and second output voltages S1 and S2 varies as a function of the tracking discriminant $E_{Rtrack}$. Since the preliminary measurement of target angular location is performed on the basis of the sampled output voltages S1' and S2', it is evident that apparent angular location as denoted by Dt'/|S1'| deviates from actual angular target location as a function of $E_{Rtrack}$. However, it is to be recalled that this deviation was quantified as a function of $E_{Rcal}$ in the calibration mode. The present invention compensates for the error inherent in a particular measurement of apparent target angular location $Dt'/|S1'|^*$ associated with a specific tracking discriminant $E_{Rtrack}^*$ by subtracting therefrom the angle correction voltage which was stored by the network 36 in association with $E_{Rcal} = E_{Rtrack}^*$ during the calibration routine. Apparent target angular location may be expressed as:

$$\frac{Dt'}{|S1'|} = \frac{G2^*g2(B2,T2,t_s) - G1^*g1(B1,T1,t_s)}{G1^*g1(B1,T1,t_s)} + \frac{q^*G2^*g2(B2,T2,t_s)}{G1^*g1(B1,T1,t_s)} \quad [7]$$

where q is a numerical scale factor. Utilization of feedback techniques to control G1 and G2 such that the channel gains are matched at the average sample time (average value of $E_{Rtrack} = 0$) allows equation [7] to be rewritten as:

$$\frac{Dt'}{|S1'|} = \frac{Dc'}{|C1'|} + \frac{q^*Dc'}{|C1'| + 1} + 1 \quad [8]$$

under the condition of $E_{Rcal} = E_{Rtrack}$, wherein the first term on the right side of equation [8] represents a bias due to differences in the transient responses of the first and second channels and the second term is the desired angle measurement modified by the scale factor q. Once apparent target angular location has been determined, a voltage proportional to the scaled, compensated measurement of the angular location ($A_{comp}$) of the target under surveillance is impressed on a signal line 62 coupled to the network 36, and may be expressed as:

$$A_{comp} = (Dt'/|S1'|) - (Dc'/|C1'|) \quad [9]$$

under the condition that the calibration discriminant $E_{Rcal}$ associated with $(Dc'/|C1'|)$ is substantially equivalent to the tracking discriminant $E_{Rtrack}$ associated with $(Dt'/|S1'|)$. Inspection of equations [8] and [9] reveals that $A_{comp} = q^*(Dc'/|C1'| + 1)$. Full, as opposed to scaled, compensation for differences in the transient gains of the first and second channels may be effected via a fully-compensated angular location measurement ($A_{comp}'$), which is given by:

$$A_{comp'} = \left| \frac{Dt'/|S1'| - Dc'/|C1'|}{Dc'/|C1'| + 1} \right| \quad [10]$$

for $Dc'/|C1'|$ evaluated at $E_{Rcal} = E_{Rtrack}$

The full compensation technique described by equation [10] will generally require that signal processing be digitally performed within the receiver 10.

While the present invention has been described herein with reference to a particular embodiment, it is understood that the invention is not limited thereto. The teachings of this invention may be utilized by one having ordinary skill in the art to make modifications within the scope thereof. For example, in alternative embodiments of the present invention it may be desired to include separate storage and compensation networks for channels dedicated to separate measurement of azimuth and elevation angles. Further, in embodiments of the receiver 10 where signal processing is performed substantially in the digital domain it may be advantageous to filter the sampled data prior to derivation of calibration and measurement data. In addition, in light of the teachings herein those skilled in the art will know to modify the present invention for utilization in both single and multiple target tracking systems. It is therefore contemplated by the appended claims to cover any and all such modifications.

Accordingly,

What is claimed is:

1. A compensated amplitude comparison monopulse receiver for determining the angular location a first object under surveillance by processing a sum and difference signal received therefrom, comprising:
   a first receiver channel for impressing a first output voltage on a first output port thereof in response to said sum signal;
   a second receiver channel for impressing a second output voltage on a second output port thereof in response to said sum and difference signals;
   calibration source means for providing at least one calibration pulse to said first and second channels wherein said calibration pulse is substantially similar to the sum signal which would be received from a second object under surveillance located a known range from said receiver;
   sample gate means for sampling said first and second output voltages and for sampling first and second calibration voltages respectively impressed on said first and second output ports when said first and second channels are driven by said calibration pulse; and
   compensation means for calculating said angular location from said sampled first and second output voltages and for adjusting said calculated angular location on the basis of said sampled calibration voltages.

2. The compensated receiver of claim 1 wherein said compensation means further includes range discriminant means, in electrical communication with said calibration source means, for generating a range discriminant signal dependent on the time differential between the simultaneous provision of said calibration pulse to said first and second receiver channels and the sampling of said first and second calibration voltages.

3. A missile radar system including a compensated amplitude comparison monopulse receiver for determining the angular location of a first object under surveillance by processing a sum and difference signal received therefrom, said compensated amplitude comparison monopulse receiver comprising:
   a first receiver channel for impressing a first output voltage on a first output port thereof in response to said sum signal;
   a second receiver channel for impressing a second output voltage on a second output port thereof in response to said sum and difference signals;
   calibration source means for providing a series of calibration pulses to said first and second channels wherein said calibration pulses are substantially similar to the sum signals which would be received from a second object under surveillance located a known range from said receiver;
   sample gate means for sampling said first and second output voltages and for sampling first and second series of calibration voltages respectively impressed on said first and second output ports when said first and second channels are driven by said calibration pulses;
   range discriminant means, in electrical communication with said calibration source means, for generating a series of calibration discriminant signals each dependent on the time differential between the provision of one of said calibration pulses to said first and second receiver channels and the sampling of the corresponding calibration voltages generated at said first and second output ports in response thereto;

difference means for generating a series of difference signals proportional to the difference between respective elements of said first and second series of sampled calibration voltages;

divider means for generating a series of angular correction voltages corresponding to the ratios of respective elements of said series of difference signals and said first series of sampled calibration voltages;

data storage means for storing said series of correction voltages and said series of calibration discriminant signals; and compensation network means, in electrical communication with said data storage means, for modifying the ratio of said sampled first output voltage to the difference between said sampled first and second output voltages thereby generating a compensated measurement of the angle of said first object.

4. A technique for compensation of measurements of the angular location of a first object under surveillance by an amplitude comparison monopulse receiver disposed to process a sum and difference signal from said first object, said receiver having a first channel with a first output port and a second channel with a second output port, comprising the steps of:
 a) driving said first channel with said sum signal thereby impressing a first output voltage on said first output port in response thereto;
 b) driving said second channel with said sum and difference signals thereby impressing a second output voltage on said second output port in response thereto;
 c) sampling said first and second output voltages;
 d) driving said first and second channels with at least one calibration pulse substantially similar to the sum signal which would be received from a second object located a known range from said receiver thereby impressing first and second calibration voltages on said first and second output ports;
 e) sampling said first and second calibration voltages;
 f) calculating said angular location measurement from said sampled first and second output voltages; and
 g) adjusting said calculated measurement on the basis of said sampled calibration voltages thereby generating a compensated measurement of the angular location of said first object.

5. The technique of claim 4 further including the steps of:
 a) driving said first and second channels with a series of calibration pulses substantially similar to the sum signals which would be engendered by a second object located a known range from said receiver thereby respectively impressing first and second series of calibration voltages on said first and second output ports;
 b) sampling said first and second series of calibration voltages; and
 c) storing said first and second series of calibration voltages.

6. The technique of claim 5 further including the steps of:

a) generating a series of calibration discriminant signals each dependent on the time differential between the provision of one of said calibration pulses to said first and second receiver channels and the sampling of the corresponding calibration voltages generated at said first and second output ports in response thereto and
 b) storing said calibration discriminant signals.

7. The technique of claim 6 further including the steps of:
 a) generating a series of calibration difference signals proportional to the difference between respective elements of said first and second series of sampled calibration voltages;
 b) generating a series of angle correction voltages corresponding to the ratios of respective elements of said series of difference signals and said first series of sampled calibration voltages; and
 c) storing said series of correction voltages and said series of calibration discriminant signals;

8. A technique for compensation of measurements of angular location in an amplitude comparison monopulse receiver disposed to process a sum and a difference signal from a first object under surveillance, said receiver having a first channel with a first output port and adjustable gain G1, and a second channel with a second output port and adjustable gain G2, comprising the steps of:
 a) driving said first channel with said sum signal thereby impressing a first output voltage on said first output port in response thereto;
 b) driving said second channel with said sum and difference signals thereby impressing a second output voltage on said second output port in response thereto;
 c) sampling said first and second output voltages and calculating the angular location of said first object therefrom;
 d) simultaneously driving said first and second channels with a series of calibration pulses substantially similar to the sum signals which would be engendered by a second object located a known range from said receiver thereby respectively impressing first and second series of calibration voltages on said first and second output ports;
 e) contemporaneously sampling said first and second series of calibration voltages thereby creating a series of sampled calibration voltage pairs wherein each of said pairs includes first and second sampled calibration voltages from said first and second output ports, respectively;
 f) converting each of said sampled calibration voltage pairs into an angle correction voltage equivalent to the ratio of said first sampled calibration voltage to the difference between said first and second sampled calibration voltages; and
 g) adjusting the ratio G2/G1 such that the respective sampled calibration voltages in at least one of said sampled calibration pairs are of substantially identical magnitude; and
 h) modifying the ratio of said sampled first output voltage to the difference between said sampled first and second output voltages in response to one of said angle correction voltages thereby generating a compensated measurement of the angular location of said first object.

9. The technique of claim 8 further including the steps of:

a) generating a series of calibration discriminant signals each dependent on the time differential between the provision of one of said calibration pulses to said first and second receiver channels and the sampling of the corresponding calibration voltages generated at said first and second output ports in response thereto and b) storing said calibration discriminant signals.

* * * * *

UNITED STATES PATENT AND TRADEMARK OFFICE
CERTIFICATE OF CORRECTION

PATENT NO. : 5,051,752
DATED : September 24, 1991
INVENTOR(S) : R.L. WOOLLEY

It is certified that error appears in the above-identified patent and that said Letters Patent is hereby corrected as shown below:

Column 1, line 5, insert:

"This invention was evolved in the performance of a contract with the U.S. Government (F08635-88-C-0093). The U.S. Government has rights in this invention pursuant to that contract."

Column 1, line 30, replace "a" with --as--.

Signed and Sealed this

Twenty-sixth Day of January, 1993

*Attest:*

STEPHEN G. KUNIN

*Attesting Officer*      *Acting Commissioner of Patents and Trademarks*